US011323922B2

(12) United States Patent
Zetterlund et al.

(10) Patent No.: US 11,323,922 B2
(45) Date of Patent: May 3, 2022

(54) MANAGING USER EQUIPMENT ROAMING STATUS CHANGES IN A RADIO ACCESS NETWORK (71) Applicant: Telefonaktiebolaget LM Ericsson (publ), Stockholm (SE)

(72) Inventors: Jerker Zetterlund, Bromma (SE); Afshin Abtin, Sollentuna (SE); Andreas Anulf, Lidingö (SE); Jan Dahl, Älvsjö (SE); Magnus Hallenstål, Täby (SE); Ralf Keller, Würselen (DE); Håkan Österlund, Ekerö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 195 days.

(21) Appl. No.: 16/475,565

(22) PCT Filed: Jan. 23, 2017

(86) PCT No.: PCT/EP2017/051301
§ 371 (c)(1),
(2) Date: Jul. 2, 2019

(87) PCT Pub. No.: WO2018/133949
PCT Pub. Date: Jul. 26, 2018

(65) Prior Publication Data
US 2021/0136633 A1 May 6, 2021

(51) Int. Cl.
H04W 4/00 (2018.01)
H04W 36/00 (2009.01)
H04W 36/14 (2009.01)
(52) U.S. Cl.
CPC ....... *H04W 36/0022* (2013.01); *H04W 36/14* (2013.01)

(58) Field of Classification Search
CPC .......................... H04W 36/0022; H04W 36/14
(Continued)

(56) References Cited

U.S. PATENT DOCUMENTS

2003/0125028 A1 7/2003 Reynolds
2003/0143996 A1* 7/2003 Peglion .................. H04W 8/06
455/432.1
(Continued)

OTHER PUBLICATIONS

International Search Report and Written Opinion dated Aug. 17, 2017 for International Application No. PCT/EP2017/051301.
(Continued)

*Primary Examiner* — Marcos Batista
(74) *Attorney, Agent, or Firm* — Christopher & Weisberg, P.A.

(57) ABSTRACT

When a user equipment is roaming in a visited network, mid-call handover from VoWiFi to VoLTE is controlled by policies enforced in the user equipment and the home network. An inter-operator policy and a subscription policy are stored in the home network and a user equipment policy is stored in the user equipment. The roaming user equipment registers in a visited network. Later, when mid-call handover to VoLTE on the visited network is desired, and also permitted by its user equipment policy, the user equipment sends a request containing a call-specific identifier which the responsible network entity in the home network compares with the registered handover parameter having regard to the inter-operator and subscription policies. If compliance with the policies is found, then the mid-call handover is proceeded with.

16 Claims, 7 Drawing Sheets (58) Field of Classification Search
USPC .......................................... 455/312; 370/331
See application file for complete search history.

(56) References Cited

U.S. PATENT DOCUMENTS

| | | | |
|---|---|---|---|
| 2007/0026862 A1* | 2/2007 | Hicks | H04W 36/30 |
| | | | 455/436 |
| 2007/0156804 A1* | 7/2007 | Mo | H04W 8/02 |
| | | | 709/200 |
| 2010/0020768 A1 | 1/2010 | Song et al. | |
| 2014/0342731 A1 | 11/2014 | Carames et al. | |
| 2015/0092709 A1* | 4/2015 | Su | H04W 48/16 |
| | | | 370/329 |
| 2015/0350983 A1 | 12/2015 | Kwok et al. | |
| 2016/0182402 A1 | 6/2016 | Carames et al. | |
| 2016/0309382 A1 | 10/2016 | Silver et al. | |

OTHER PUBLICATIONS

Norell et al. "Wi-Fi calling—extending the reach of VoLTE to Wi-Fi"; Ericsson Review—The communications technology journal; Jan. 30, 2015, consisting of 8-pages.

GSM Association Official Document IR.65—IMS Roaming and Interworking Guidelines; Version 20.0; pp. 1-57; Jun. 7, 2016; consisting of 57-pages.

GSM Association Official Document IR.65—IMS Roaming and Interworking Guidelines; Version 19.1; pp. 1-56; Jun. 1, 2016; consisting of 56-pages.

EPO Communication dated Dec. 11, 2020 for International Application No. 17700997.4, consisting of 8-pages.

Indian Examination Report dated Mar. 15, 2021 for International Application No. 201947033044 filed Aug. 16, 2019, consisting of 5-pages.

Apostolis K. Salkintzis et al.; Voice Call Handover Mechanisms in Next-Generation 3GPP Systems; LTE-3GPP Release 8; IEEE Communications Magazine, Feb. 2009, consisting of 11-pages.

\* cited by examiner

FIG. 10 ance is a Submission Under 35 U.S.C. § 371
MANAGING USER EQUIPMENT ROAMING STATUS CHANGES IN A RADIO ACCESS NETWORK

CROSS-REFERENCE TO RELATED APPLICATIONS

This application is a Submission Under 35 U.S.C. § 371 for U.S. National Stage Patent Application of International Application Number: PCT/EP2017/051301, filed Jan. 23, 2017 entitled "MANAGING USER EQUIPMENT ROAMING STATUS CHANGES IN A RADIO ACCESS NETWORK," the entirety of which is incorporated herein by reference.

TECHNICAL FIELD

The present disclosure relates to managing changes in roaming status of a user equipment (UE) in a radio access network, such as when there is a need for mid-call handover in a UE from WiFi to a radio access network, such as LTE, as may be desirable when a wireless LAN (WLAN) can no longer support a call via WiFi, e.g. when the UE moves out of range of the WLAN.

BACKGROUND

The 3rd Generation Partnership Project (3GPP) architecture has introduced a subsystem known as the IP Multimedia Subsystem (IMS) as an addition to the Packet-Switched (PS) domain. IMS supports new, IP-based multimedia services as well as interoperability with traditional telephony services. 3GPP has chosen the Session Initiation Protocol (SIP) for control plane signalling between the terminal and the IMS as well as between the components within the IMS. SIP is used to establish and tear down multimedia sessions in the IMS. SIP is a text-based request-response application level protocol developed by the Internet Engineering Task Force (IETF).

For VoLTE, three different roaming architectures are proposed in the IMS Roaming and Interworking Guidelines, Jun. 7, 2016, GSMA PRD IR.65 v20.0, the entire contents of which are incorporated herein by reference. The three alternatives are LBO-VR (Local Breakout VPLMN routing), LBO-HR (Local Breakout HPLMN routing) and S8HR (S8 Home Routed). Among these, S8HR is gaining increasing favour.

Roaming may be considered as a situation in which a UE, which is associated with a user having a user account with one mobile network, is currently located in a region covered by a different mobile network, which it uses for communication. A typical example would be during international travel. We refer to the user's mobile network as the home mobile network or home PLMN (HPLMN) and to the mobile network where the user equipment is roaming as the visited mobile network or visited PLMN (VPLMN).

Within the S8HR roaming model, if the UE moves out of WiFi coverage during a VoWiFi call, the call can be retained by handover to VoLTE. The roaming status of the user will then change from non-roaming (VoWiFi) to roaming (VoLTE) during the call. Similarly in reverse, the roaming status will change from roaming to non-roaming during the call if the UE performs handover from LTE to WiFi.

For VoWiFi, the UE connects via the Internet with an ePDG in the home PLMN. This means that when WiFi calling is used abroad, no network resources of a mobile operator are used in any visited network and thus the UE is in most cases not considered roaming and is not subject to roaming charges. However, if the UE uses macro cell radio access such as VoLTE when abroad, network resources will be used in a visited network and roaming charges may apply.

If the roaming status changes during a call, the end-user may be subject to roaming charges, even if he started the call as non-roaming. Such a change could be significant from a charging point of view and could result in a bill shock for the user.

There are several existing subscriber level services in VoLTE networks designed to restrict roaming and avoid bill shock, but those services operate at the time of call setup only and will thus not be executed at mid-call handover from VoWiFi to VoLTE.

SUMMARY

According to a first aspect of the disclosure there is provided a user equipment for performing calls in a home network, the user equipment comprising:
a network transceiver operable to wirelessly connect to a radio access network for performing a call using a communication network; and
processing circuitry,
the user equipment being adapted to use the processing circuitry and/or the network transceiver to:
store mid-call handover policy information indicating roaming policy for the user equipment related to mid-call handover to one or more roaming networks;
initiate a call in a home network via the radio access network;
identify a need to attempt a mid-call handover of the call in the home network to one of the roaming networks; and
transmit a mid-call handover request to the home network via the radio access network based on the mid-call handover policy information.

According to a second aspect of the disclosure there is provided a method for a user equipment to perform calls in a home network, the user equipment comprising:
a network transceiver operable to wirelessly connect to a radio access network for performing a call using a communication network; and
processing circuitry,
the method comprising using the processing circuitry and/or the network transceiver to:
store mid-call handover policy information indicating roaming policy for the user equipment related to mid-call handover to one or more roaming networks;
initiate a call in a home network via the radio access network;
identify a need to attempt a mid-call handover of the call in the home network to one of the roaming networks; and
transmit a mid-call handover request to the home network via the radio access network based on the mid-call handover policy information.

The mid-call handover policy information may be derived from a subscription policy in the home network for the user equipment. The mid-call handover policy information may be derived from an inter-operator policy governing roaming rights between the home network and the target roaming network. The mid-call handover policy information may include one or more mobile country codes and one or more mobile network codes of networks where the user equipment has permissions to roam.

The network transceiver may further comprise a wireless local area network transceiver operable to connect wirelessly to local area networks, so that the user equipment can connect via the Internet to the home network, e.g. while physically located in a region covered by a roaming network without accessing the roaming network. The processing circuitry is operable in some embodiments to initiate the call in the home network using the wireless local area network transceiver.

The network transceiver may further comprise a mobile network transceiver operable to connect wirelessly to mobile networks. The processing circuitry is operable in some embodiments to transmit the mid-call handover request using the mobile network transceiver over the target roaming network.

The user equipment may further perform, and/or may be adapted to perform, a handover, e.g. with support of and/or managed by a core network, in particular of the home network and/or the roaming networks. The user equipment may comprise a corresponding handover unit, and/or may be adapted to utilise its processing circuitry and/or radio circuitry therefor. Performing (mid-call) handover may comprise switching from one RAN to another RAN, e.g. from WLAN to E-UTRAN or a 5G or NR network, or from E-UTRAN associated to the home network to another E-UTRAN associated to the roaming network. Performing the handover may be based on a successful attempt, and/or a handover permitting indication (e.g., a message or signal or response) received from the home network, via the radio access network via which the call was initiated. Such an indication may provide information indicating and/or allowing handover, e.g. regarding characteristics of the roaming network. The indication may be considered to be based on, and/or to represent a command to grant or deny the handover request. Performing the handover may comprise not performing switching to another network and/or RAN if the indication or command indicates that the request is denied. In some variants, performing the handover may be based on one or more handover parameters.

It may be considered that the user equipment is adapted for, and/or perform, pre-registration with the roaming network, e.g. based on measurements identifying or detecting one or more cells of the roaming network (respectively, its RAN), and/or when detecting that the roaming network, respectively its RAN, provides coverage to the UE. The user equipment may be adapted to utilise its radio circuitry and/or processing circuitry therefor, and/or comprise a corresponding preregistration unit. Pre-registration may comprise transmitting one or more registration messages to the roaming network and/or its associated RAN or radio access node. A registration message may for example identify the user equipment and/or the associated (subscriber) identity to the roaming network, and/or provide capability information indicating for example transmission and/or reception and/or measurement capabilities of the user equipment to the roaming network, respectively an associated radio access node. Pre-registration may be performed before and/or when initiating a call in the home network, and/or before identifying a need to attempt handover. In some variants, pre-registration may be performed while the call is ongoing, before identifying the need and/or before transmitting the handover request.

According to a third aspect of the disclosure there is provided a computer program stored on a computer readable medium and loadable into the internal memory of a user equipment, comprising software code portions, when said program is run on a user equipment, for performing the method of the second aspect. A computer program product may also be used to store the computer program.

According to a fourth aspect of the disclosure there is provided a network entity for a public land mobile network, referred to as the home network, the network entity being adapted for making user-equipment mid-call roaming connection decisions to another network, referred to as a target roaming network, the network entity comprising:
 a receiver operable to receive a mid-call handover request to a target roaming network relating to a call in progress by a user equipment on the home network;
 processing circuitry operable to decide whether to grant the mid-call handover request conditional on access to the target roaming network being allowed by at least one of: a subscription policy in the home network for the user equipment making the call; and an inter-operator policy specifying roaming rights between the home network and the target roaming network; and
 a transmitter operable to send a command to grant or deny the mid-call handover request based on the processing circuitry's decision.

According to a fourth aspect of the disclosure there is provided a public land mobile network comprising a network entity according to the fourth aspect.

According to a fifth aspect of the disclosure there is provided a method for a network entity of a public land mobile network, referred to as a home network, to manage mid-call handovers from the home network to a target roaming network, the method comprising:
 receiving a mid-call handover request to a target roaming network relating to a call in progress by a user equipment on the home network;
 deciding whether to grant the mid-call handover request conditional on access to the target roaming network being allowed by at least one of: a subscription policy in the home network for the user equipment making the call; and an inter-operator policy specifying roaming rights between the home network and the target roaming network; and
 transmitting a command to grant or deny the mid-call handover request based on said deciding.

In some embodiments, the mid-call handover request includes a call-specific identifier relating to the call in progress, and the processing circuitry is operable to check the or each policy based on the call-specific identifier.

In some embodiments, the call-specific identifier includes the mobile country code and mobile network code of the target roaming network to which the user equipment is requesting mid-call handover.

The network entity may further comprise a memory in which is stored mid-call handover policy information for one or more user equipments specifying user equipment rights to make mid-call handovers to one or more roaming networks and the processing circuitry is operable to check the or each policy by looking up the mid-call handover policy information for the user equipment making the call.

The mid-call handover policy information for each user equipment may include mobile country codes and mobile network codes of the roaming networks where the user equipment has permissions to roam.

The network entity with the above-specified functionality can be any one of a variety of network entities, for example: a proxy call session control function; a home subscriber server; or an application server.

The transmitter and/or receiver in the network entity may have at least one of a wired and a wireless communication functionality. Reference to wired encompasses for example metal or metallic wired connections and also optical fibre connections.

The network entity may provide, and/be adapted to provide, a handover permitting indication to the user equipment, e.g. utilising its processing circuitry and/or radio circuitry, and/or a corresponding unit.

According to a sixth aspect of the disclosure there is provided a computer program stored on a computer readable medium and loadable into the internal memory of a network entity, comprising software code portions, when said program is run on a network entity, for performing the method of the fifth aspect. A computer program product may also be provided for storing the computer program.

Generally, a radio access network may be a WLAN and/or WiFi network, or a cellular network as defined according to a telecommunications standard, e.g. a 3GPP standard like LTE or NR. For example, a radio access network (RAN) may be E-UTRAN as defined in one of the LTE releases.

The home network may be a network a UE is subscribed to, e.g. according to a subscriber identity, e.g, represented by a SIM/USIM (Subscriber Identity Module) or corresponding module, card and/or circuitry. The home network may represent and/or comprise a core network accessible via an associated RAN, e.g. a cellular network, and/or via the internet, which may be accessible via a different RAN, e.g. a WLAN.

Generally, a RAN associated to a core network may allow wireless access to the core network, in particular utilising local network arrangements, which in some variants may not be part of the internet. WLAN may be considered a RAN which is not associated to a or any core network.

A roaming network may be a network the UE is not subscribed to. However, the UE may be registered (pre-registered) to the roaming network. A roaming network may comprise a core network (different from the core network of the home network). A RAN, e.g. an E-UTRAN or a NR RAN, may be associated to the roaming network.

A home network and a roaming network may generally be assigned different country codes, and/or may be associated to different countries.

A mid-call handover may generally pertain to a handover while a call is ongoing or in progress and/or a VoLTE connection, e.g. to a counterpart UE is maintained.

Processing circuitry may generally comprise integrated circuitry, and/or one or more controllers and/or processors, e.g. microcontroller and/or microprocessors, and/or one or more processor cores. In some variants, processing circuitry may for example comprise ASIC (Application Specific Integrated Circuitry) and/or FPGA circuitry (Field-Programmable Gate Array). Processing circuitry may comprise, and/or be connected or connectable to, memory, which may comprise volatile or non-volatile memory, e.g. optical memory and/or magnetic memory and/or RAM (Random Access Memory) and/or ROM (Read-Only Memory) and/or flash memory and/or buffer memory and/or cache memory.

Any of the modules or units described herein may be implemented in software and/or hardware and/or firmware, e.g. utilising the circuitry described herein.

A transceiver may generally comprise radio circuitry providing transmitting and receiving functionality. The radio circuitry may comprise a receiver and transmitter in separate circuitries, or in shared or common circuitry (transceiver circuitry). A transceiver may comprise separate radio circuitry for accessing different RANs and/or frequency ranges, e.g. different transceivers for accessing WLAN and a cellular RAN like E-UTRAN.

A receiver of a network entity may comprise, and/or represent a wireless receiver, and/or a cable- or wire-bound receiver, e.g. utilising an optical cable or fibre, or a copper wire or cable.

Identifying a need to attempt a mid-call handover may be triggered by the user equipment, and/or by the radio access network, e.g. a radio access node like an eNodeB or an Access Point. Identifying the need may be based on measurements, e.g. pertaining to signal strength and/or quality and/or neighbouring cells, which may be performed by the user equipment, and/or a radio access network, in particular the radio access network over which the UE communicates, for example one or more associated radio access nodes. Generally, the handover request may be in response to a network-triggered handover attempt, and/or triggered by the user equipment itself. A network-triggered handover attempt may be comprise receiving a corresponding triggering indication from the triggering network. Such network-triggering may be performed on the RAN level, and/or be performed on the, and/or supported by, the core network.

A radio access node may generally represent a network node adapted to provide radio access and/or an air interface to one or more user equipments, e.g. according to a radio access technology (RAT), for example LTE, NR or WLAN. Examples of radio access nodes comprise Access Points, eNodeBs, relay nodes, micro-nodes, wireless routers, etc.

BRIEF DESCRIPTION OF THE DRAWINGS

The embodiments of the present disclosure presented herein are described herein below with reference to the accompanying drawings.

DETAILED DESCRIPTION

In the following description, for purposes of explanation and not limitation, specific details are set forth (such as particular method steps) in order to provide a thorough understanding of the technique presented herein. It will be apparent to one skilled in the art that the present technique may be practiced in other embodiments that depart from these specific details. For example, while the following embodiments will be described with reference to 5G and also 4G networks, it will be appreciated that the technique presented herein is not limited to any type of cellular network access. Moreover, it is noted that other embodiments may relate to and include new radio (NR) networks.

Those skilled in the art will further appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and systems, the technique presented herein may also be embodied in a computer program product as well as in a system comprising a computer processor and a memory coupled to the processor, wherein the memory is encoded with one or more programs that execute the services, functions and steps disclosed herein.

Memory may comprise any known computer-readable storage medium, which is described below. In one implementation, cache memory elements of memory provide temporary storage of at least some program code (e.g., program code) in order to reduce the number of times code needs to be retrieved from bulk storage while instructions of the program code are carried out. Moreover, similar to CPU, memory may reside at a single physical location, comprising one or more types of data storage, or be distributed across a plurality of physical systems in various forms.

Certain terms used in the following detailed description of exemplary embodiments are defined as follows:

4G: is the fourth generation of mobile telecommunications technology as defined by the ITU in IMT Advanced, such as LTE.

5G: is the fifth generation of mobile telecommunications and wireless technology which is not yet fully defined, but in an advanced draft stage, e.g. in 3GPP TS 23.401 version 13.6.1 Release 13 of May 2016. For the purposes of this document LTE is considered to include 5G.

AS/TAS: A telephony application server (TAS) or application server (AS) is a server which is brought into or notified of a call by the network in order to provide call features or other behaviour. In IMS, an application server is a SIP entity which is invoked by the I/S-CSCF. The application server may reject or accept calls, redirect calls, pass a call back to the I/S-CSCF as a proxy, originate new calls. It may choose to remain in the signalling path, or drop out. The application server communicates with the IMS core via a SIP interface.

Cx: is an interface used between CSCF and HSS.

Diameter: is an authentication, authorization, and accounting protocol used extensively in various aspects of 3GPP IMS, for example to support Cx, Rx and Ro interfaces.

Gx: is the interface used between the PGW, PCRF and the Policy and Charging Enforcement Function (PCEF), providing control over policy and flow-based charges for subscribers.

PVNI: is the P-Visited-Network-ID, which is a SIP header field used to convey to the home proxy in the home network the identifier of a visited network.

Rf: is the interface used between the CDF and CSCF to control the charging trigger function for generating offline charging information.

Ro: is the interface used between the OCS and CSCF to control the charging trigger function for generating on charging information.

Rx: is the interface used between the PCRF and the application function (e.g. P-CSCF) to exchange application-level session information.

SIP: is the protocol used for messaging defined in the IETF's RFC 3261 "SIP: Session Initiation Protocol"

UA: is part of a UE and acts as a client in a TP for communication with a server.

UE: is a terminal that resides with the user which hosts a UA.

WiFi: is an environment and interface allowing an electronic device, such as a UE, to wirelessly connect to, and form part of, a wireless LAN (WLAN). Currently, WiFi mainly uses 2.4 GHz and 5 GHz frequency bands.

The description uses a number of acronyms, the meaning of which is as follows:

Abbreviation Explanation

3GPP Third Generation Partnership Project
ACA Accounting Answer (Diameter message)
ACR Accounting Request (Diameter message)
AS Application Server (=TAS)
BGCF Breakout Gateway Control Function
CCA Credit Control Answer
CCR Credit Control Request
CDF Charging Data Function—used for offline billing (sometimes called OFCS=Offline Charging System)
CNI Header Cellular-Network-Information Header (a SIP header)
CSCF Call Session Control Function
eNB eNodeB
ePDG Evolved Packet Data Gateway
E-UTRAN Evolved UTRAN (=LTE)
HO Handover
HPLMN Home Public Land Mobile Network (sometimes called HPMN)
HSS Home Subscriber Server
IBCF Interconnection Border Control Function
I-CSCF Interrogating CSCF
IMS IP Multimedia Subsystem
IMS AGW IMS Access Gateway
IPsec Internet Protocol Security (secure IP protocol involving packet encryption)
IPX IP eXchange
LAN Local Area Network
LTE Long Term Evolution (of RAN)
MCC Mobile Country Code
MGCF Media Gateway Control Function
MME Mobility Management Entity
MMTel Multimedia Telephony Service
MMTelAS MMTel Application Server (=TAS, AS)
MNC Mobile Network Code
OCS Online Charging System—used for online billing
P-CSCF Proxy CSCF
PANI Header P-Access-Network-Information Header (SIP header)
PCEF Policy and Charging Enforcement Function
PCRF Policy and Charging Rules Function
PDN Packet Data Network
PGW PDN Gateway
PLMN Public Land Mobile Network
PVNI P-Visited-Network-Identifier (a SIP header)
RAN Radio Access Network
RAR Re-Auth-Request (Rx interface message)

RTP Real-time Transport Protocol (part of user plane interface)
S8 LTE interface for communicating between a home PLMN and a visited PLMN (see e.g. TS 23.401 v 841)
S8HR S8 Home Routing
SBG Session Border Gateway (=IBCF)
S-CSCF Service/Serving CSCF
SGSN Serving GPRS Support Node
SGW Signalling Gateway
SIP Session Initiation Protocol (control plane interface)
TAS Telephony Application Server (=AS)
TDM Time Division Multiplexing
TP Transport Protocol
TrGW Transition Gateway
UA User Agent
UAA User-Authorization-Answer (Diameter message)
UAR User-Authorization-Request (Diameter message)
UE User Equipment
VoLTE Voice Over LTE
VPLMN Visited Public Land Mobile Network (sometimes called VPMN)

According to embodiments of the disclosure, we propose that, when a UE is physically located in a region covered by a visited network, mid-call handover from VoWiFi to VoLTE is controlled by policies enforced in the UE and/or the home network by IMS. An inter-operator policy and a subscription policy are stored in the home network and a UE policy is stored in the UE. When located abroad, the UE may register with the home network through a WiFi network in the visited country. Later, when mid-call handover to VoLTE on a visited network is desired, and also permitted by its UE policy, the UE sends a request containing a call-specific user identifier which the responsible network entity in the home network compares with the registered handover parameter having regard to the inter-operator and subscription policies. If compliance with the policies is found, then the mid-call handover is proceeded with. Otherwise the call is terminated, at least insofar as it is attempting to connect through the visited network.

The proposed solution controls mid-call handover from home access to roaming access, where an example of interest is from WiFi to LTE. Mid-call handover is especially relevant when WiFi calling is used abroad, so that bill shock for the end user is avoided, and so that the operator can differentiate services. The policies are to be enforced in the UE and in the home network's IMS. It is noted that the 3GPP standards will need new functions to support the proposed policies. Existing UE and PLMN devices will also need to be modified to support these new standard functions in order to implement embodiments of the present disclosure.

It is proposed that three new policies are introduced as follows.

Mid-call handover policy: A roaming policy for mid-call handover which is set and enforced in the UE and which is used to indicate if handover to VoLTE is allowed or prohibited for the UE when roaming in a visited network.

Subscription Policy: A subscription policy is provisioned for the subscriber which is used to indicate if handover is allowed or prohibited for the subscription when roaming in a visited network. This policy is enforced in the IMS core network.

Inter-operator Policy: An inter-operator policy is configured on network level per peering network which is used to indicate if any handover at all is allowed to the visited network. This policy is enforced in the IMS core network.

The detailed description below relates to handover of calls between home WiFi and a visited LTE (e.g. S8HR VoLTE), but the solution is more general and the same mechanisms can be used to control handover between other radio technologies.

The proposed solution has the following advantages.
1. The Mid-call handover policy gives the operator or user/end-user maximum control of enabling/disabling handover to roaming.
2. The Subscription Policy gives the operator flexibility in differentiating services for various subscriptions.
3. The Inter-operator Policy enables the operator to allow or restrict handover to specific roaming partners depending on each roaming agreement.

On the home network policing side, the new functionality can be incorporated in a number of different network entities of the IMS core network. For example HSS, CSCF, IBCF (SBG) and TAS are all suitable. On the UE side, the new functionality is of course to be incorporated in the UE. The proposed solution is relevant to any mobile network operator offering VoWiFi access.

The proposed solution is relevant to 3GPP and GSMA. More specifically, the required functionality to implement embodiments of the disclosure could be incorporated in any of the following standards in a new release:

3GPP TS 24.229, "3rd Generation Partnership Project; Technical Specification Group Core Network and Terminals; IP multimedia call control protocol based on Session Initiation Protocol (SIP) and Session Description Protocol (SDP); Stage 3", release 15+

3GPP TS 29.229 "3rd Generation Partnership Project; Technical Specification Group Core Network and Terminals; Cx and Dx interfaces based on the Diameter protocol; Protocol details", release 14+

GSMA PRD IR.51, "IMS Profile for Voice, Video and SMS over Wi-Fi", release 4+

GSMA PRD IR.65 "IMS Roaming and Interworking Guidelines", release 21+

GSMA PRD IR.92, "IMS Profile for Voice and SMS", release 11+

GSMA PRD XXX? "Open Market Devices profile", release 1+

A specific embodiment of the proposed solution is now described with reference to the drawings.

Figure 1:
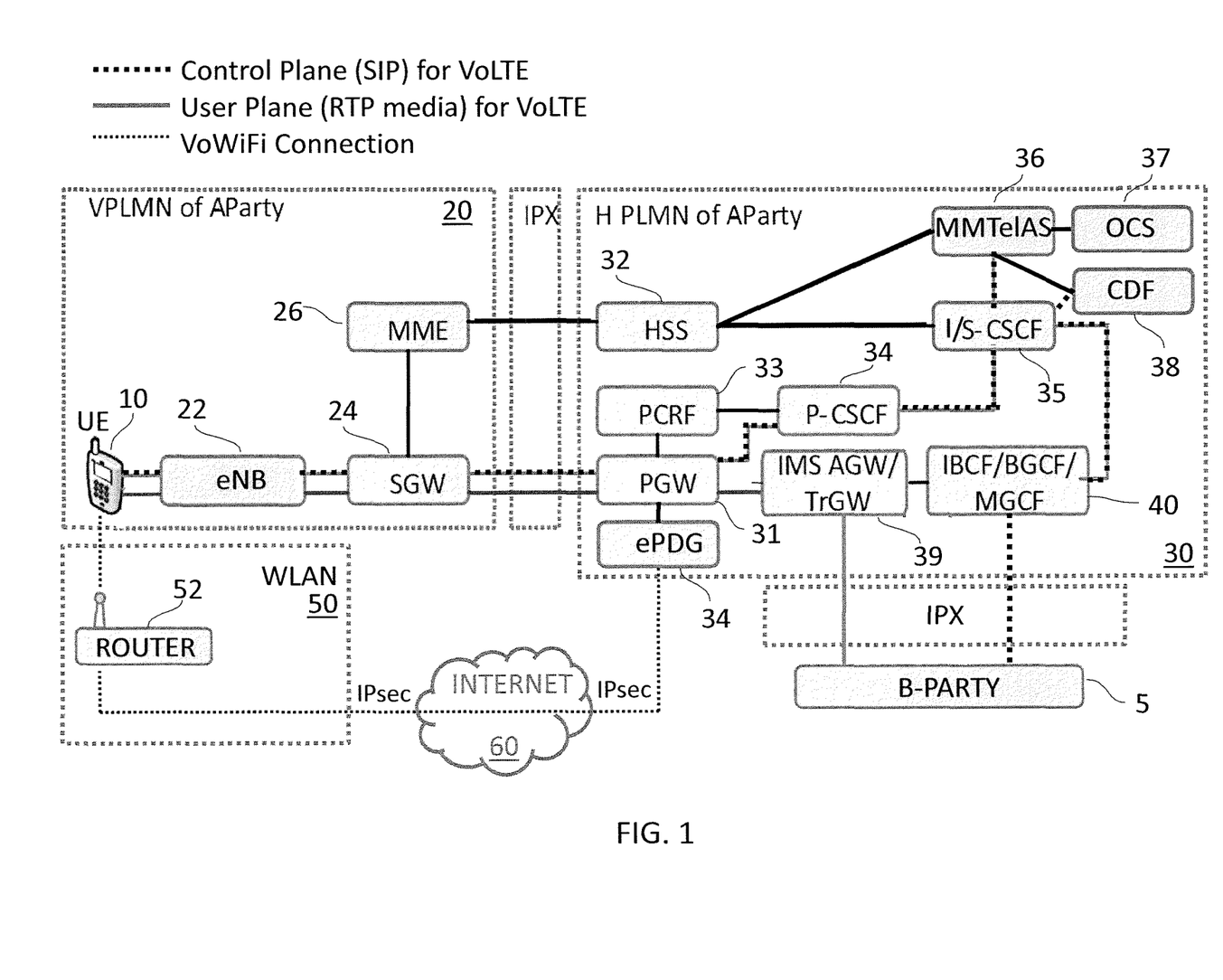
FIG. 1 is a schematic diagram showing a hybrid VoWiFi and VoLTE architecture, where the VoLTE architecture is based on S8HR.

FIG. 1 is a schematic diagram showing a hybrid VoWiFi and VoLTE architecture, where the VoLTE architecture is based on S8HR. The VoLTE part of the diagram shows control plane and user plane routing in an S8HR VoLTE roaming architecture which follows FIG. 2-8 of the "IMS Roaming and Interworking Guidelines", 7 Jun. 2016, GSMA PRD IR.65 v20.0.

An example scenario within this system environment is as follows.

A UE 10 that is physically situated in a region covered by VPLMN 20 connects to its HPLMN 30 via IPX. The user associated with this UE is referred to as the A-Party. The A-Party can connect via its HPLMN 30 to the UE of another user, referred to as a B-Party 5, via IPX as illustrated, or TDM. IMS Voice is supported both by the VPLMN 20 and the HPLMN 30. Subject to a permissive roaming agreement being in place, the HPLMN and VPLMN are able to exchange information and agree via the IPX to VoLTE roaming using S8HR, taking into account local regulatory requirements in the VPLMN.

In the VPLMN, the UE 10 forms a connection with an eNB 22 which in turn forms a connection to a SGW 24 which in turn forms a connection to a PGW 31 in the HPLMN 30 via IPX. Each of these connections has a control plane (shown with a dotted line), for example using SIP, and a user plane (shown with a solid grey line), for example using RTP. The SGW 24 also forms a connection with an MME 26 in the VPLMN 20, and the MME 26 forms a connection to an HSS 32 in the HPLMN 30.

In the HPLMN 30 the other illustrated components are as conventional, and connected to each other with various interfaces as conventional, in the manner envisaged in the above-mentioned GSMA PRD IR.65 v20.0 document. The additional HPLMN components that are illustrated are: PCRF 33, P-CSCF 34, I- and/or S-CSCF 35, MMTelAS 36, OCS 37, CDF 38, IMS AGW/TrGW 39, IBCF/BGCF/MGCF 40 and ePDG 41.

It will be appreciated that the VPLMN 20 will also have the same components in the same arrangement, but FIG. 1 is limited to showing the HPLMN and VPLMN components that play a role in the roaming of the UE in the VPLMN.

The UE 10 is also able to connect via WiFi to a WLAN 50 which includes a router 52. The router 52 has a connection such as a fixed line or wireless connection, e.g. metal cable and/or optical fibre, to the Internet 60, via which it can connect to the HPLMN through the HPLMN's ePDG 34. A secure connection, such as using IPsec, can thus be established for carrying voice between the UE 10 and its HPLMN 30 which avoids the VPLMN 20, so avoids the possibility of incurring roaming charges. The A-Party carrying UE 10 can thereby initiate or receive a VoWiFi call to or from the B-Party.

Figure 2:
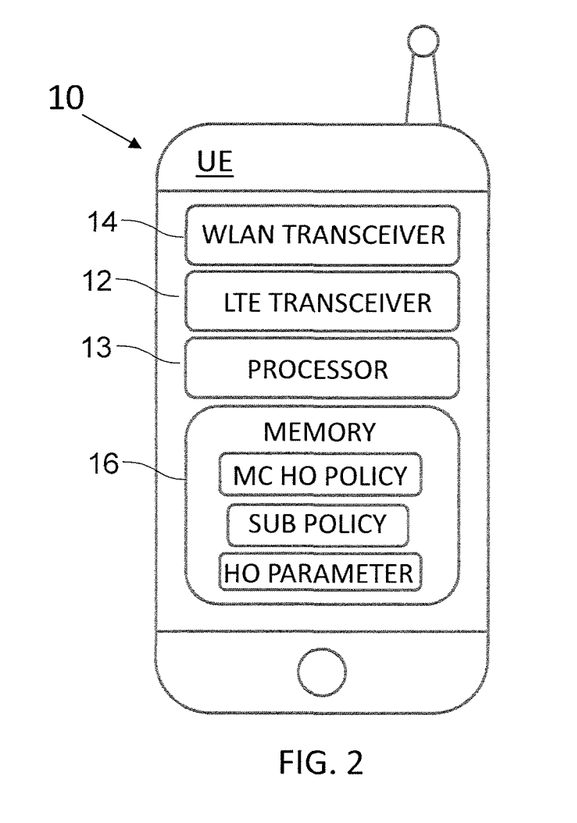
FIG. 2 is a schematic drawing of a UE according to embodiments of the present disclosure.

FIG. 2 is a schematic drawing showing selected components of the UE 10 of FIG. 1. The UE 10 is associated with a user (A-Party) having a user account with a mobile network, for example through a SIM card (not shown). The UE 10 has an LTE transceiver 12 operable to connect to any mobile network or PLMN, and also a WLAN transceiver 14 operable to connect wirelessly to a LAN. Wired connection interfaces (not shown) may also be provided, e.g. for copper wire or optical fibre. The UE 10 has a memory 16, which is operable to store configuration data in respect of the PLMN to which the user account is tied, referred to as the home PLMN (HPLMN). The UE also has a processor 13 with processing circuitry. The configuration data includes a mid-call handover policy (MC HO POLICY) governing roaming rights in respect of mid-call handover of calls initiated in the LAN to a visited PLMN (VPLMN), i.e. a mobile network other than the HPLMN. The memory is further operable to store a copy of the handover parameter (HO PARAMETER) for the user governing roaming rights inter alia in the VPLMN to which the UE is currently connected as well as optionally other policy data, such as the mid-call handover policy and/or the user's subscription policy (SUB POLICY).

In use, the LTE transceiver 12 is operable to receive a UE-specific handover parameter from the HPLMN 30, when the UE 10 is connected to a VPLMN 20. When a call is in progress using the WLAN and the UE decides to attempt a mid-call handover to the VPLMN, the LTE transceiver is operable to transmit a request for the call in progress to be registered on the HPMLN. The request contains a call-specific user identifier relating to the call in progress, which is configured to comply with the UE-specific handover parameter. The request includes the MCC and MNC of the visited network.

The UE receives the handover parameter from the HPLMN when the UE connects to a new roaming network, rather than waiting to obtain the handover parameter until a call is in progress. Pre-registration is triggered by the UE detecting that it has connected to a VPLMN. To avoid multiple duplicate registrations, the trigger can be conditional on the connection being to a VPLMN that is different from the last PLMN which the UE was connected to. On triggering, the UE receives the handover parameter from the HPLMN, the handover parameter having the role of determining whether to permit mid-call WiFi-to-LTE handover of calls, or other changes in roaming status. The UE then receives the handover parameter from the HPLMN via the VPLMN. The handover parameter may be additionally composed with reference to the copy of the subscription policy. The subscription policy governs roaming rights in the current VPLMN.

Mid-call handover is performed after initiating a call through WLAN when the UE and/or an LTE network entity and/or another network entity decides that a handover to LTE is desirable, e.g. because of loss of WLAN connection, or poor data throughput on the WLAN connection. The UE transmits a request to the VPLMN for the call in progress to be registered on the HPLMN. The request contains a call-specific user identifier relating to the call in progress which is configured to comply with the UE-specific handover parameter pre-registered to the HPLMN. The call-specific user identifier is at least in part derived from the mid-call handover policy and may also be derived in part from the user's subscription policy, if a copy of this is stored in the UE's memory.

Figure 3:
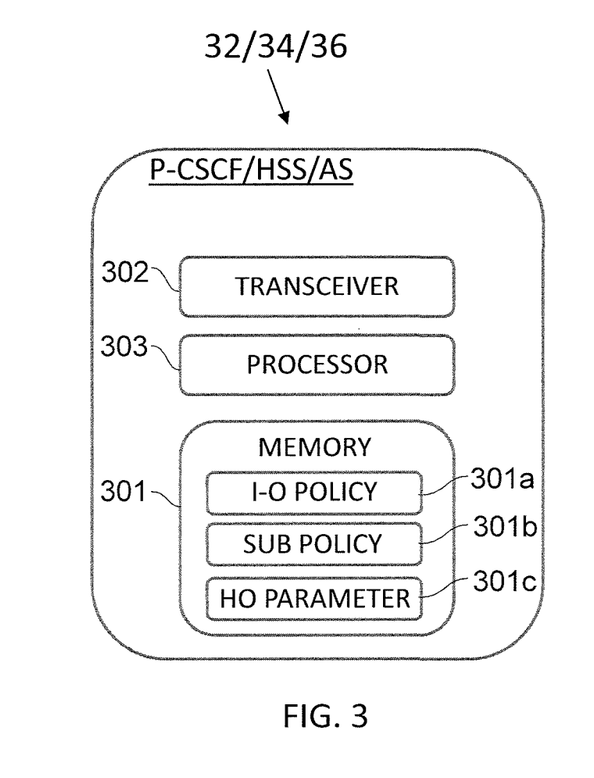
FIG. 3 is a schematic drawing of a network entity of a PLMN according to embodiments of the present disclosure.

FIG. 3 is a schematic drawing of a network entity of the HPLMN according to embodiments of the present disclosure, this being the network entity that is tasked with making mid-call handover decisions from VoWiFi to VoLTE in respect of UEs. According to the embodiments described below with reference to FIGS. 4, 5 and 6 respectively, this network entity may be the HSS 32, the MMTelAS 36 or the P-CSCF 34 of the HPLMN 30. As described elsewhere in this document, various different network entities of the HPLMN are suitable candidates for assuming the role of policing the UE's ability to handover WiFi calls to LTE when connected to a VPLMN. The network entity has memory 301. The memory 301 has: a portion 301a for storing an inter-operator policy governing roaming rights between the HPLMN and VPLMNs (I-O POLICY); a portion 301b for storing a subscription policy governing roaming rights in VPLMNs, the subscription policy (SUB POLICY) being specific to a user with an account with the HPLMN; and a portion 301c for storing the pre-registered UE-specific handover parameter(s) (HO PARAMETER). The network entity also has a transceiver 302 operable as a receiver to receive the UE-specific handover parameters from UEs that are roaming, and also call-specific user identifiers relating to calls in progress by the UEs who are requesting mid-call handover to a VPLMN. It will be understood by the skilled person that the UE will have a transceiver, i.e. a receiver and transmitter, although the narrow description of the present functionality involves solely a receiver function. The network entity also includes a processor 303 that comprises processing circuitry and is operable to check whether the call-specific user identifier is compliant with the UE-specific handover parameter. If compliance is determined, then the processor can use its processing circuitry to initiate a request to register the call on the HPLMN 30 by messaging the relevant charging system network entities, such as the OCS 37 and CDF 38. If non-compliance is determined, the processor causes the call to be terminated.

Figure 4:
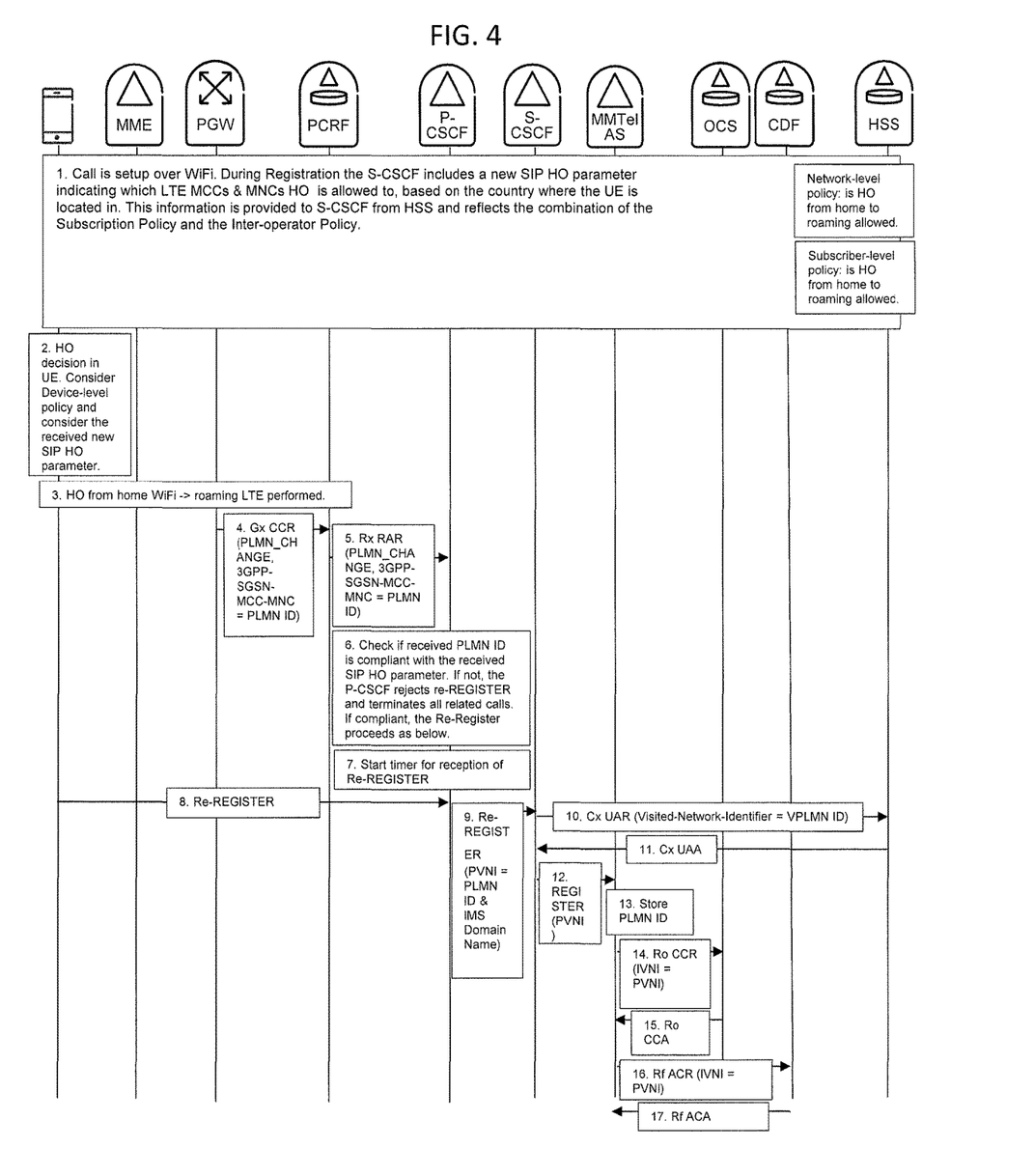
FIG. 4 is a signalling flow diagram for a mid-call access change from WiFi to LTE according to a first embodiment involving policing in the P-CSCF.

FIG. 4 is a signalling flow diagram for a mid-call access change from WiFi to LTE according to a first embodiment involving policing in the P-CSCF.

In Step 1, preparation measures are undertaken, so that a call can be set-up over WiFi, either immediately or at some later time. We refer to this as registration, where the registration relates to the UE (pre-)registering with its home network where it is roaming. During registration, the I/S-CSCF transmits to the UE a new SIP handover parameter indicating to which LTE MCCs & MNCs handover is permitted. The SIP handover parameter is based on the country where the UE is currently located. This information is provided to I/S-CSCF from HSS and reflects the combination of the Subscription Policy and the Inter-operator Policy which will have independent conditions on handover permissions for roaming in the country where the UE is located. The SIP handover parameter is thus specific to a particular user equipment and its current location.

In Step 2, a VoWiFi call is in progress at the UE. The VoWiFi call is taking place on the HPMN (i.e. not on the VPMN). For some reason it becomes desirable or necessary to move away from VoWiFi. At this point, the UE makes a decision on whether to request handover to VoLTE (which would require the call continuing on the VPMN, i.e. being moved from the HPMN to the VPMN). This decision is made with reference to a Mid-call handover policy stored on the UE and optionally also in relation to the SIP handover parameter (the current one as created in Step 1). The decision may be to attempt mid-call handover to VoLTE, to terminate the VoWiFi call, or to attempt to continue the VoWiFi call despite, for example, signal strength problems.

In Step 3, assuming the UE has decided to attempt mid-call handover to VoLTE, handover is attempted by the UE making a re-registration request. We refer to re-registration to make a distinction from the earlier registration of the SIP HO parameter.

In Step 4, using the Gx interface between the PGW 31 and the PCRF 33, a credit control request (CCR) is made in the HPLMN specifying the 3GPP version being used and the current SGSN, MCC and MNC, where these parameters collectively form a identifier of the VPLMN (PLMN ID). The argument PLMN_CHANGE indicates that the PGW has detected a change in PLMN. The argument 3GPP-SGSN-MCC-MNC is a Gx/Rx attribute-value pair which includes the PLMN ID of the new PLMN. For more details, see 3GPP TS 29.212.

In Step 5, using the Rx interface between PCRF 33 and P-CSCF 34, a re-authorization request (RAR) is made with the PLMN ID.

In Step 6, the P-CSCF checks whether the received PLMN ID is compliant with the (earlier) received SIP handover parameter. If not compliant, the P-CSCF rejects the UE's re-registration request and terminates the call and any further related calls (at least over LTE). If compliant, the re-registration request proceeds as follows.

In Step 7, the P-CSCF sets a time limit for re-registration to be completed. This is a back-stop in case the subsequent steps time out.

In Step 8, after handover is complete, the UE is re-registered to the P-CSCF and, in Step 9, the P-CSCF sends a re-registration request specifying the PVNI to the I/S-CSCF including the VPLMN ID and the IMS domain name. P-CSCF sets PVNI with the PLMN ID received in Step 5 and its own domain name. This is to indicate the true location of the UE.

In Step 10, using the Cx interface between I/S-CSCF and HSS, a user authorization request (UAR) is sent to the HSS with the VPLMN ID.

In Step 11, the HSS replies to the I/S-CSCF with a user authorization answer (UAA).

In Step 12, the I/S-CSCF registers the call with the telephony application server (MMTelAS) whereupon in Step 13 the MMTelAS stores the VPLMN ID.

Next the network entities responsible for charging are communicated with, namely the OCS, which is responsible for online billing, and the CDF, which is responsible for offline billing.

In Step 14, using the Ro interface between the MMTelAS and the OCS, a credit control request (CCR) update is sent from MMTelAS to OCS which is then replied to, in Step 15, with a credit control answer (CCA). The acronym IVNI in Step 14 is the IMS-Visited-Network-Identifier attribute-value pair sent over Rf/Ro to carry PVNI, which may be represented by a suitable parametrisation or indication, e.g. by CCR. In Step 16, using the Rf interface between the MMTelAS and the CDF, an accounting request (ACR) is sent from the MMTelAs to the CDF. The ACR is replied to in Step 17 with an accounting answer (ACA).

The VoLTE transfer is now concluded, with the call now being fully set up by the HPLMN in respect of the necessary permissions and charging functions.

Figure 5:
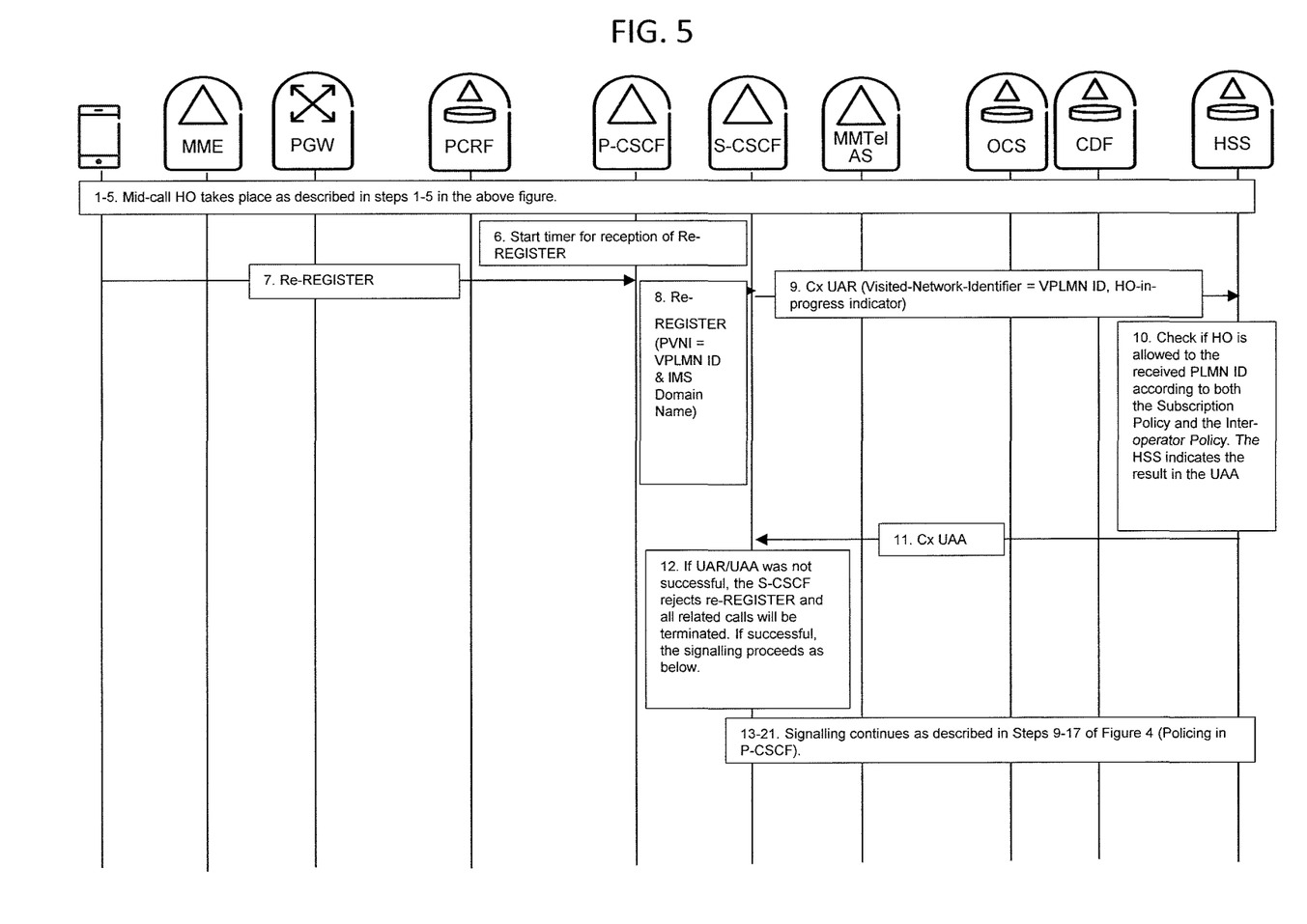
FIG. 5 is a signalling flow diagram for a mid-call access change from WiFi to LTE according to a second embodiment involving policing in the HSS.

FIG. 5 is a signalling flow diagram for a mid-call access change from WiFi to LTE according to a second embodiment involving policing in the HSS.

For Steps 1 to 5, the process flow according the embodiment of FIG. 5 is the same as in the embodiment of FIG. 4. At this stage, the P-CSCF has received the re-registration request from the UE, but no analysis of the re-registration request has been performed.

In Step 6, the P-CSCF sets a time limit for re-registration to be completed. This is a back-stop in case the subsequent steps time out. (Same as Step 7 of FIG. 4.)

In Step 7, the UE is re-registered to the P-CSCF. (Same as Step 8 of FIG. 4.)

In Step 8, the P-CSCF sends a re-registration request PVNI to the I/S-CSCF including the VPLMN ID and the IMS domain name. (Same as Step 9 of FIG. 4.)

In Step 9, using the Cx interface between I/S-CSCF and HSS, a user authorization request (UAR) is sent to the HSS with the VPLMN ID and also a handover-in-progress indicator, which may be considered an example of a HO indicator. (Comparable but not the same as in Step 10 of FIG. 4, since in FIG. 4 no SIP handover parameter is sent to the HSS, since the P-CSCF makes the compliance check between VPLMN ID and SIP handover parameter.)

In Step 10, the HSS checks if handover is allowed to the received VPLMN ID according to both the Subscription Policy and the Inter-operator Policy by checking compliance between the just received PLMN ID and the SIP HO parameter stored in the HSS since registration.

In Step 11, the HSS sends the result in a UAA responding to the UAR of Step 9.

In Step 12, if the UAA indicates non-compliance, the S-CSCF rejects the UE's re-registration request and terminates the call and any further related calls (at least over LTE). If the UAA indicates compliance, the re-registration request proceeds in the same was as described in relation to the embodiment of FIG. 4, namely by following Steps 9 to 17 of FIG. 4, which can be thought of respectively as Steps 13 to 21 of FIG. 5.

Figure 6:
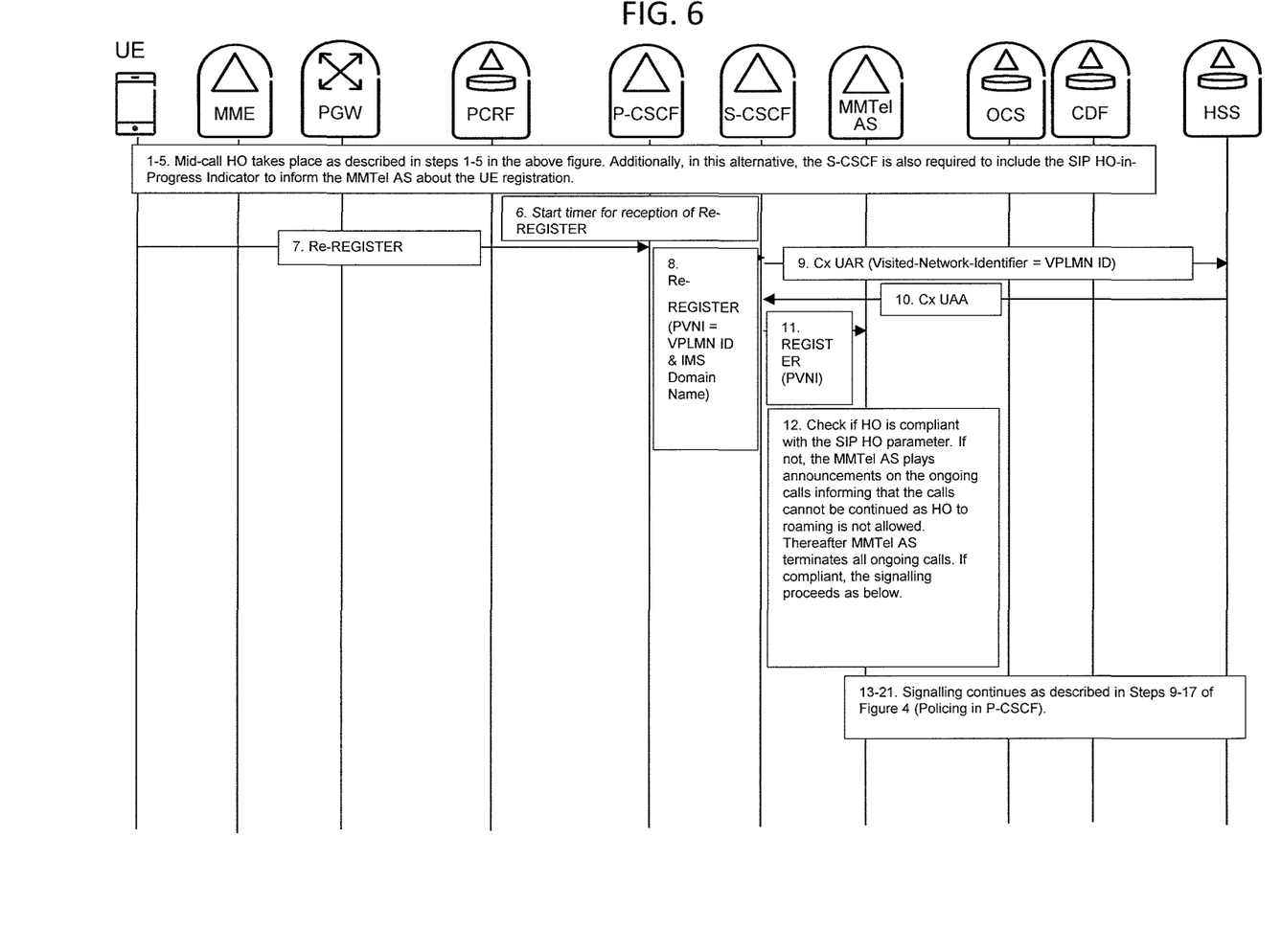
FIG. 6 is a signalling flow diagram for a mid-call access change from WiFi to LTE according to a third embodiment involving policing in the MMTelAS.

FIG. 6 is a signalling flow diagram for a mid-call access change from WiFi to LTE according to a third embodiment involving policing in the MMTelAS.

For Steps 1 to 5, the process flow according the embodiment of FIG. 6 is the same as in the embodiment of FIG. 4 except that as part of the registration the I/S-CSCF sends the SIP HO-in-progress indicator to the MMTelAs where it is stored. At this stage, the P-CSCF has received the re-registration request from the UE, but no analysis of the re-registration request has yet been performed.

Steps 6, 7 and 8 of FIG. 6 are the same as the same numbered steps in FIG. 5.

In Step 9, using the Cx interface between I/S-CSCF and HSS, a user authorization request (UAR) is sent to the HSS with the VPLMN ID.

In Step 10, the HSS replies to the I/S-CSCF with a user authorization answer (UAA).

In Step 11, the S-CSCF sends a re-registration request PVNI to the MMTel AS. As in Step 8, the PVNI is made up of the VPLMN ID and IMS Domain Name (Same as Step 9 of FIG. 4.)

In Step 12, the MMTelAS checks if handover is compliant with the SIP HO parameter. If not, the MMTelAS terminates the ongoing call. Optionally, before terminating the MMTelAS can play announcements on the ongoing call informing participants that the call cannot be continued, since handover to roaming is not allowed. If compliant, the signalling proceeds in the same was as described in relation to the embodiment of FIG. 4, namely by following Steps 9 to 17 of FIG. 4, which can be thought of respectively as Steps 13 to 21 of FIG. 6.

Figure 7:
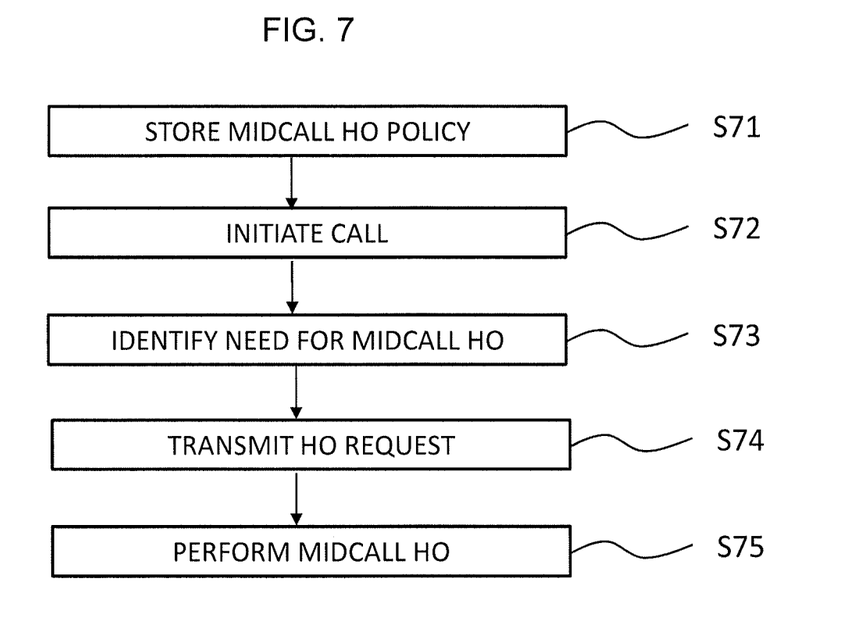
FIG. 7 is a flow diagram showing a method by which a user equipment makes a mid-call handover according to an embodiment of the present disclosure.

FIG. 7 is a flow diagram showing a method by which a user equipment makes a midcall handover according to an embodiment of the present disclosure. The user equipment is able to perform calls in a home network and comprises a network transceiver operable to wirelessly connect to a radio access network for performing a call using a communication network. The user equipment further comprises processing circuitry. In Step 71, the processing circuitry and/or the network transceiver store mid-call handover policy information indicating roaming policy for the user equipment related to mid-call handover to one or more roaming networks. This can be done, for example, when the user equipment registers to a roaming network. In Step 72, the processing circuitry and/or the network transceiver initiate a call in a home network via the radio access network. In Step 73, the processing circuitry and/or the network transceiver identify a need to attempt a mid-call handover of the call in the home network to one of the roaming networks, referred to as a target roaming network. In Step 74, the processing circuitry and/or the network transceiver transmit a mid-call handover request to the home network via the radio access network based on the mid-call handover policy information. In Step 75, the processing circuitry and/or the network transceiver perform midcall handover of the user equipment.

Figure 8:
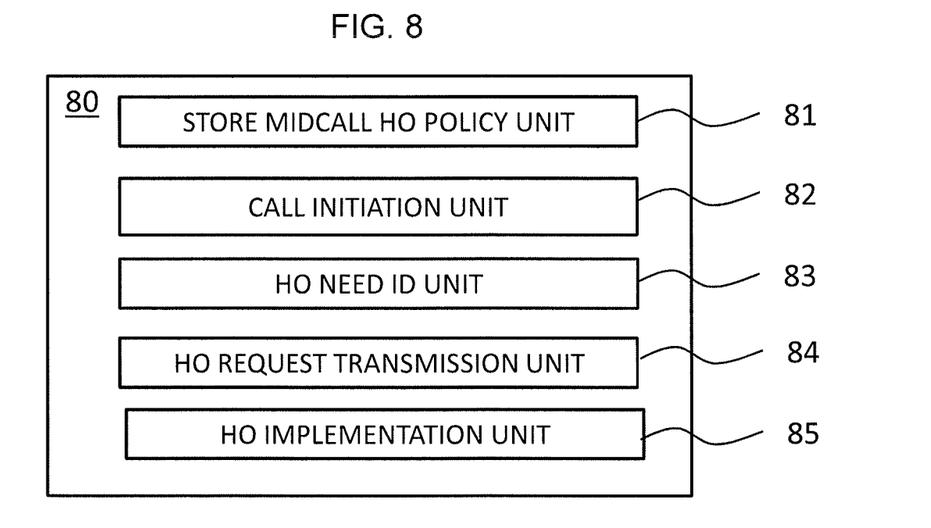
FIG. 8 is a block schematic diagram of a user equipment capable of making a mid-call handover according to an embodiment of the present disclosure.

FIG. 8 is a block schematic diagram of a user equipment 80 capable of making a midcall handover according to an embodiment of the present disclosure. The user equipment 80 comprises a mid-call handover policy information storage unit 81 operable to store mid-call handover policy information indicating roaming policy for the user equipment related to mid-call handover to one or more roaming networks. The user equipment 80 comprises a call initiation unit 82 operable to initiate a call in a home network via the radio access network. The user equipment 80 comprises a handover need identifier unit 83 operable to identify a need to attempt a mid-call handover of the call in the home network to one of the roaming networks, referred to as a target roaming network. The user equipment 80 comprises a handover request transmission unit 84 operable to transmit a mid-call handover request to the home network via the radio access network based on the mid-call handover policy information. The user equipment 80 comprises a handover implementation unit 85 operable to perform midcall handover of the user equipment.

Figure 9:
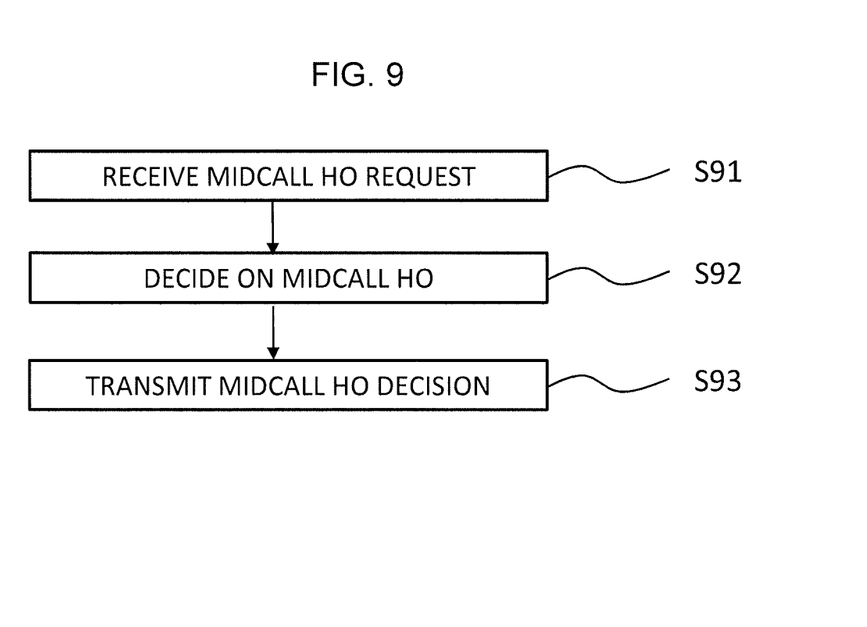
FIG. 9 is a flow diagram showing a method by which a network entity of a PLMN makes a mid-call handover according to an embodiment of the present disclosure.

FIG. 9 is a flow diagram showing a method by which a network entity of a PLMN—the home network—makes a midcall handover to a target roaming network according to an embodiment of the present disclosure. In Step 91, the network entity receives a mid-call handover request to a target roaming network relating to a call in progress by a user equipment on the home network. In Step 92, the network entity decides whether to grant the mid-call handover request conditional on access to the target roaming network being allowed by at least one of: a subscription policy in the home network for the user equipment making the call; and an inter-operator policy specifying roaming rights between the home network and the target roaming network. In Step 93, the network entity transmits a command to grant or deny the mid-call handover request based on said deciding. The handover then proceeds or does not proceed to perform handover.

Figure 10:
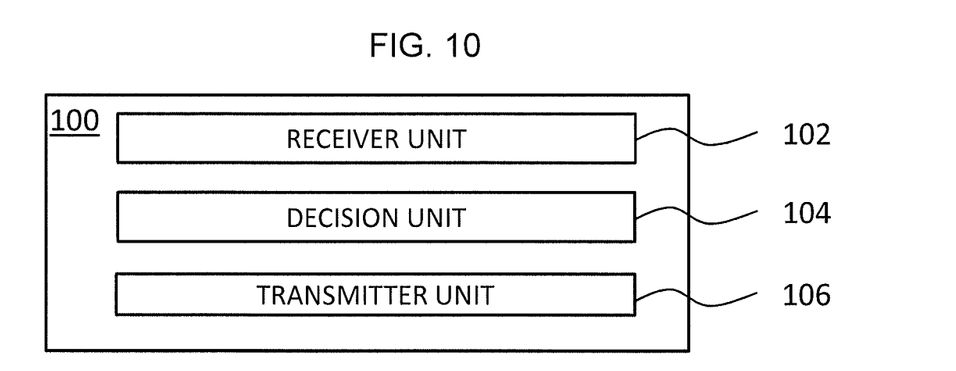
FIG. 10 is a block schematic diagram of a network entity of a PLMN capable of making a mid-call handover according to an embodiment of the present disclosure.

FIG. 10 is a block schematic diagram of a network entity 100 of a PLMN capable of making a midcall handover from a home network according to an embodiment of the present disclosure. The network entity 100 is adapted for making user-equipment mid-call roaming connection decisions to another network, referred to as a target roaming network. The network entity 100 comprises a receiver unit 102 operable to receive a mid-call handover request to a target roaming network relating to a call in progress by a user equipment on the home network. The network entity 100 comprises a decision unit 104 operable to decide whether to grant the mid-call handover request conditional on access to the target roaming network being allowed by at least one of: a subscription policy in the home network for the user equipment making the call; and an inter-operator policy specifying roaming rights between the home network and the target roaming network. The network entity 100 comprises a transmitter unit 106 operable to send a command to grant or deny the mid-call handover request based on the processing circuitry's decision.

According to the above embodiments, it is proposed that the IMS core network sets a new property either in SIP response during registration, or in VoWiFi call-setup signalling, indicating whether handover to LTE is allowed or not to one or more visited LTE networks (i.e. VPLMNs) in the country where the UE is currently located. This property is based on information from the HSS in the HPLMN. The UE should act accordingly and should not attempt handover to a forbidden network and the UE should also indicate to the end-user with a symbol or similar on the display if handover is possible or not. However, if the UE nevertheless attempts handover to a forbidden network, the following three alternatives have been identified for network enforcement of Subscription or Inter-operator handover restriction:

1. Re-Register at handover can be rejected by the P-CSCF in the HPLMN based on the previously signalled handover policy indicator. This means all calls are dropped for the registration in question.

2. Re-Register at handover can be rejected by the HSS in the HPLMN through diameter messaging of the Cx interface between SCSCF and HSS for user authorization (UAR/UAA commands). This means all calls are dropped for the registration in question.

3. The AS (e.g. MMTelAS) can terminate all calls related to the re-registration but the registration will be kept, which may be desired in case the UE is permitted to place or receive new calls in the roaming network, although not permitted to perform mid-call handover from VoWiFi to VoLTE. With this alternative, the TAS may also play an announcement or send a written message to the affected UE prior to dropping the call explaining the current policy settings.

Three levels of policies for handling handover between home-connected VoWiFi and roaming VoLTE are proposed:

1. Mid-call handover policy: This policy specifies whether handover, or specific handover features, are enabled on the device. The Mid-call handover policy can be controlled via one or more configuration parameters for the UE. The user and/or operator should have the possibility to activate/de-activate handover from/to WiFi. Such settings are similar to known settings for activating/deactivating data roaming or telephony roaming. It can be considered if the setting should be done per visited country, or if a single master setting would be sufficient. The setting applies mid-call only and is independent of the "AS Services Communication Barring when Roaming" which operates at call setup.

2. Subscription policy: This policy specifies whether handover is enabled for a specific subscription. The Subscription policy helps preventing unwanted handover to avoid bill-shock so that operators do not have to rely on the user configuring the above Mid-call handover policy correctly. It should be considered by the operator to align the policies for outgoing/incoming communication barring when roaming with the handover policies described herein. For example, only subscribers which do not have communication barring when roaming activated shall be allowed to perform mid-call handover to roaming. This policy could be considered to be set per country, which would allow for increased flexibility (as well as complexity).

3. Inter-operator policy: This policy specifies whether the VPLMN and HPLMN agree to enable handover. It can be expected that the VPLMN will probably accept incoming handover as long as the network supports it, but may not allow handover from visited LTE to home WiFi. Moreover, HPLMN will probably accept incoming handover to home WiFi but may have business reasons to not allow handover to visited LTE.

If the Mid-call handover policy prevents handover, then the UE should not attempt handover but should stay on the original radio access. That is Mid-call handover policy has supremacy over Subscription policy and Inter-operator policy. In any case, it is envisaged that all three policies are required to permit a handover for the handover to take place. Ideally, when handover is not allowed due to Subscription or Inter-operator policies, the call should not be terminated when handover is attempted. Instead, the desired behaviour would be to make the UE stay on the original radio access, even if signal strength is bad. Such a functionality could be achieved if the UE is aware of the service policies. Enforcing service policies may be done in IMS rather than in MME or PCRF. MME or PCRF enforcement is possible, but is not a preferred solution, since EPC nodes are usually not involved in such service level actions. Especially in roaming scenarios where the MME is in a visited network, the download of subscriber-specific information should be avoided. This also applies to PCRF in other roaming architectures.

In FIGS. 4 to 6, the illustrated signalling flows show the SIP handover parameter at registration (and not on call setup). Using registration for distributing the SIP handover parameter has the advantage that the relevant policies are distributed to the responsible network entity in the HPLMN ahead of making a call, so this does not need to be done as part of each call, but rather occasionally at an appropriate time, for example each time the UE connects to a VPLMN which is different from the PLMN to which it was last connected. On the other hand, the SIP handover parameter could first be distributed on a per call basis on initiation of each call. A mixed solution could also be adopted, whereby the SIP handover parameter is distributed each time a call is initiated by way of an update, but the call may use a previous state of the SIP handover parameter, if the current state does not have time to propagate to the responsible network entity in the HPLMN.

In respect of each of FIGS. 4 to 6, the following additional comments are applicable to particular implementations.

The proposed SIP handover parameter may be set differently based on which country the UE is located in at the time of the registration. The reason is that the subscription policy and/or inter-operator policy may be based on VPLMN, i.e. may vary from country to country. The country where the UE is located is determined from the MCC. When the UE is connected to LTE, the MCC is in the cell-ID, more specifically in the SIP PANI header. When the UE is connected to WiFi, the MCC can be found in the SIP CNI header, or alternatively the country can be found by a country code set by the UE in the SIP PANI header. The proposed SIP handover parameter can also be set differently based on which visited mobile network the UE is connected to, so may include the MNC of that network as well as the MCC of the visited country.

The Mid-call handover policy and/or Subscription policy could be set up in the UE via the user interface, for example via an app.

The UE may display on the graphical user interface of the UE whether mid-call handover to the visited network is possible or not.

The action of allowing or not allowing a handover can also be made visible in the related charging information as displayed on a display or printed in hard copy on paper or another physical substrate, for example as an invoice.

In principle, the Subscription policy and Inter-operator policy elements could be enforced by different network entities, rather than the same entity. In FIG. 4, both policies are enforced by the P-CSCF. In FIG. 5, both policies are enforced by the AS. In FIG. 6, both policies are enforced by the HSS. In alternative embodiments, one of these policies could be stored in and enforced by one of these three network entities and the other by another of the AS, P-CSCF or HSS. In particular, the Inter-operator policy could be hosted by an ICBF which can perform a peeking function on the visited network, while the Subscription policy is hosted elsewhere, e.g. in the HSS, AS or P-CSCF.

References to VoWiFi and VoLTE calls should be construed to mean any call having a voice component, and thus include combined video (Vi) and audio, so called ViWiFi and ViLTE, as well as pure audio calls. In any case, the proposed solution can be implemented for any call type, so is not specific to the call having a voice component.

In summary, we have described a system and method designed to provide additional management of roaming status changes when a UE is physically located outside its home network region in a region covered by a visited network. When there is a change in the UE's roaming status, such as mid-call handover from VoWiFi to VoLTE, whether to permit this handover is controlled by policies enforced in the UE and the home network. An inter-operator policy and a subscription policy are stored in the home network and in combination allow a handover parameter for a UE to be determined. The roaming UE registers in a visited network and as part of the registration the home network transmits, i.e. signals, the handover parameter to the UE which the UE stores. Later, when a change of roaming status, such as a mid-call handover to VoLTE on the visited network, is desired, and also permitted by its UE policy, the UE sends a request containing a call-specific user identifier which the responsible network entity on the home network compares with the handover parameter having regard to the inter-operator and subscription policies. If compliance with the policies is found, then the change of roaming status, such as a mid-call handover, is proceeded with.

For some embodiments, the relationships between the three policies described herein and the HO parameter can be summarised as follows:
- the inter-operator policy and subscription policy are stored in the home network;
- the inter-operator policy and subscription policy together determine the HO parameter which is signalled to and stored in the UE;
- the mid-call handover policy is stored in the UE; and
- the UE decides whether to attempt mid-call handover with reference to the HO parameter and the mid-call handover policy.

An embodiment of the present disclosure may take the form of a computer program product in one or more computer-readable storage medium(s) (e.g., a memory and/or a computer data storage unit) having computer-readable program code embodied or stored thereon. A computer data storage unit may comprise any known computer-readable storage medium. For example, a computer data storage unit may be a non-volatile data storage device, such as a semiconductor memory, a magnetic disk drive (i.e., hard disk drive) or an optical disc drive (e.g., a CD-ROM drive which receives a CD-ROM disk). Program code embodied on a computer-readable medium may be transmitted using any appropriate medium, including but not limited to wireless, wireline, optical fibre cable, radio frequency (RF), etc., or any suitable combination of the foregoing.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A user equipment for performing calls in a home network, the user equipment comprising:
   a network transceiver configured to wirelessly connect to a radio access network for performing a call using a communication network;
   processing circuitry; and
   the user equipment being configured to use at least one of the processing circuitry and the network transceiver to:
      store mid-call handover policy information indicating roaming policy for the user equipment related to mid-call handover to one or more roaming networks, the mid-call handover policy information comprising mobile country codes and mobile network codes of networks where the user equipment has permissions to roam and to perform handover;
      initiate a call in a home network via the radio access network;
      identify a need to attempt a mid-call handover of the call in the home network to one of the roaming networks, the identifying the need to attempt a mid-call handover being based on measurements performed by the user equipment pertaining to at least one of a signal strength and a signal quality, and the user equipment being configured to use at least one of the processing circuitry and the network transceiver to decide to request a handover from the home network to one of the roaming networks when permitted by the mid-call handover policy stored on the UE; and
      based on the decision to request a handover from the home network to one of the roaming networks, transmit a mid-call handover request to the home network via the radio access network based on the mid-call handover policy information.

2. The user equipment of claim 1, wherein the network transceiver comprises a wireless local area network transceiver configured to connect wirelessly to local area networks so that the user equipment can connect via the Internet to the home network.

3. The user equipment of claim 2, wherein the processing circuitry is configured to initiate the call in the home network using the wireless local area network transceiver.

4. The user equipment of claim 1, wherein the network transceiver comprises a wireless local area network transceiver configured to connect wirelessly to local area networks so that the user equipment can connect via the Internet to the home network.

5. The user equipment of claim 4, wherein the processing circuitry is configured to initiate the call in the home network using the wireless local area network transceiver.

6. The user equipment of 1, wherein the network transceiver comprises a mobile network transceiver configured to connect wirelessly to mobile networks.

7. The user equipment of claim 6, wherein the processing circuitry is configured to transmit the mid-call handover request using the mobile network transceiver over a radio access network associated with the home network.

8. A method for a user equipment to perform calls in a home network, the user equipment comprising a network transceiver configured to wirelessly connect to a radio access network for performing a call using a communication network and processing circuitry, the method comprising:
   using at least one of the processing circuitry and the network transceiver to:
      store mid-call handover policy information indicating roaming policy for the user equipment related to mid-call handover to one or more roaming networks, the mid-call handover policy information comprising mobile country codes and mobile network codes of networks where the user equipment has permissions to roam and to perform handover;
      initiate a call in a home network via the radio access network;
      identify a need to attempt a mid-call handover of the call in the home network to one of the roaming networks, the identifying the need to attempt a mid-call handover being based on measurements performed by the user equipment pertaining to at least one of a signal strength and a signal quality, and the user equipment being configured to use at least one of the processing circuitry and the network transceiver to decide to request a handover from the home network to one of the roaming networks when permitted by the mid-call handover policy stored on the UE; and based on the decision to request a handover from the home network to one of the roaming networks, transmit a mid-call handover request to the home network via the radio access network based on the mid-call handover policy information.

9. A public land mobile network entity for a home network, the network entity being configured to make user-equipment mid-call roaming connection decisions to a target roaming network, the network entity comprising:

a receiver configured to receive a mid-call handover request for a handover from the home network to the target roaming network relating to a call in progress by a user equipment on the home network, the mid-call handover request comprising a call-specific identifier relating to the call in progress and comprising mobile country codes and mobile network codes of networks where the user equipment has permissions to roam and to perform handover and the mid-call handover request for a handover from the home network to the target roaming network being based on measurements performed by the user equipment pertaining to at least one of a signal strength and a signal quality, a mid-call handover policy stored on the user equipment and a decision by the user equipment to request a handover from the home network to the target roaming network;

processing circuitry configured to decide whether to grant the mid-call handover request and conditional on access to the target roaming network being allowed by an inter-operator policy specifying roaming rights between the home network and the target roaming network with regard to the call-specific identifier; and a transmitter configured to one of send a command to grant and deny the mid-call handover request based on the processing circuitry's decision.

10. The network entity of claim 9, further comprising a memory in which is stored mid-call handover policy information for at least one user equipment specifying user equipment rights to make mid-call handovers to at least one roaming network, and wherein the processing circuitry is configured to check conformance with a mid-call handover policy by looking up the mid-call handover policy information associated with the user equipment making the call.

11. The network entity of claim 9, further comprising a memory in which is stored mid-call handover policy information for at least one user equipment specifying user equipment rights to make mid-call handovers to at least one roaming network, and wherein the processing circuitry is configured to check a mid-call handover policy by looking up the mid-call handover policy information associated with the user equipment making the call.

12. The network entity of claim 9, wherein the network entity is selected from the group consisting of: a proxy call session control function; a home subscriber server; and an application server.

13. The network entity of claim 9, wherein at least one of the transmitter and the receiver have at least one of a wired and a wireless communication functionality.

14. The network entity of claim 9, wherein the network entity is comprised in a public land mobile network.

15. The network entity of claim 9, wherein the network entity is selected from the group consisting of: a proxy call session control function; a home subscriber server; and an application server.

16. A method for a public land mobile network entity for a home network, to manage mid-call handovers from the home network to a target roaming network, the method comprising:

receiving a mid-call handover request for a handover from the home network to the target roaming network relating to a call in progress by a user equipment on the home network, the mid-call handover request comprising a call-specific identifier relating to the call in progress and comprising mobile country codes and mobile network codes of networks where the user equipment has permissions to roam and to perform handover and the mid-call handover request being based on measurements performed by the user equipment pertaining to at least one of a signal strength and a signal quality, a mid-call handover policy stored on the user equipment and a decision by the user equipment to request a handover to the home network;

deciding whether to grant the mid-call handover request for a handover from the home network to the target roaming network conditional on access to the target roaming network being allowed by an inter-operator policy specifying roaming rights between the home network and the target roaming network with regard to the call-specific identifier; and transmitting a command to one of grant and deny the mid-call handover request based on the decision.

* * * * *